United States Patent
Truong et al.

(10) Patent No.: US 8,040,916 B2
(45) Date of Patent: Oct. 18, 2011

(54) ADMISSION CONTROL FOR VIRTUALIZED SERVICES IN ROUTERS

(75) Inventors: Alex Van Truong, San Jose, CA (US); Durai Chinnaiah, San Jose, CA (US); Padmakumar Sundararajan, Fremont, CA (US); Kirankumar Vishnubhatla, San Jose, CA (US); Padmanabha-rao N. Melanahalli, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 859 days.

(21) Appl. No.: 11/686,152

(22) Filed: Mar. 14, 2007

(65) Prior Publication Data

US 2008/0225889 A1 Sep. 18, 2008

(51) Int. Cl.
*H04J 3/22* (2006.01)
(52) U.S. Cl. .................... 370/468; 370/230; 370/235
(58) Field of Classification Search .............. 709/223; 370/230, 235, 236, 395.1, 395.43, 468, 329
See application file for complete search history.

(56) References Cited

U.S. PATENT DOCUMENTS

| | | | | |
|---|---|---|---|---|
| 5,491,694 | A * | 2/1996 | Oliver et al. | 370/455 |
| 6,469,982 | B1 * | 10/2002 | Henrion et al. | 370/230 |
| 6,501,734 | B1 * | 12/2002 | Yu et al. | 370/236 |
| 6,738,348 | B1 * | 5/2004 | Rollins | 370/230 |
| 6,744,767 | B1 * | 6/2004 | Chiu et al. | 370/395.21 |
| 7,191,273 | B2 * | 3/2007 | Weber | 710/244 |
| 2003/0210665 | A1 * | 11/2003 | Salmenkaita et al. | 370/330 |
| 2004/0117577 | A1 * | 6/2004 | Bloks | 711/167 |
| 2006/0020694 | A1 * | 1/2006 | Nag et al. | 709/223 |
| 2006/0133275 | A1 * | 6/2006 | Dabagh et al. | 370/230 |
| 2007/0086433 | A1 * | 4/2007 | Cunetto et al. | 370/352 |
| 2008/0181173 | A1 * | 7/2008 | Wei | 370/329 |

* cited by examiner

*Primary Examiner* — Andrew Lai
(74) *Attorney, Agent, or Firm* — P. Su

(57) ABSTRACT

In one embodiment, a method includes receiving a request to provision a first customer interface to a service instance, and identifying a resource capacity for a resource associated with a service controller of a system. A determination is made as to whether a sum of resource requirements for a first set of customer interfaces that does not include the first customer interface exceeds the resource capacity. The method further includes provisioning the first customer interface to the service instance if it is determined that the sum of the customer instance resource requirements does not exceed the resource capacity.

23 Claims, 4 Drawing Sheets

ADMISSION CONTROL FOR VIRTUALIZED SERVICES IN ROUTERS

BACKGROUND OF THE INVENTION

As packet-based networks evolve, network elements such as routers are beginning to perform services in addition to packet forwarding services. Services provided by routers may be supported in a virtualized manner and, hence, may result in multiple service instances of any given service. Hence, each user or customer of a router may be allocated resources that are needed to provide the given service or, more specifically, resources needed to support an instance of the given service. Efficiently allocating the resources increases the likelihood that assured service levels may be maintained by a service provider.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

General Overview

Figure 1A:
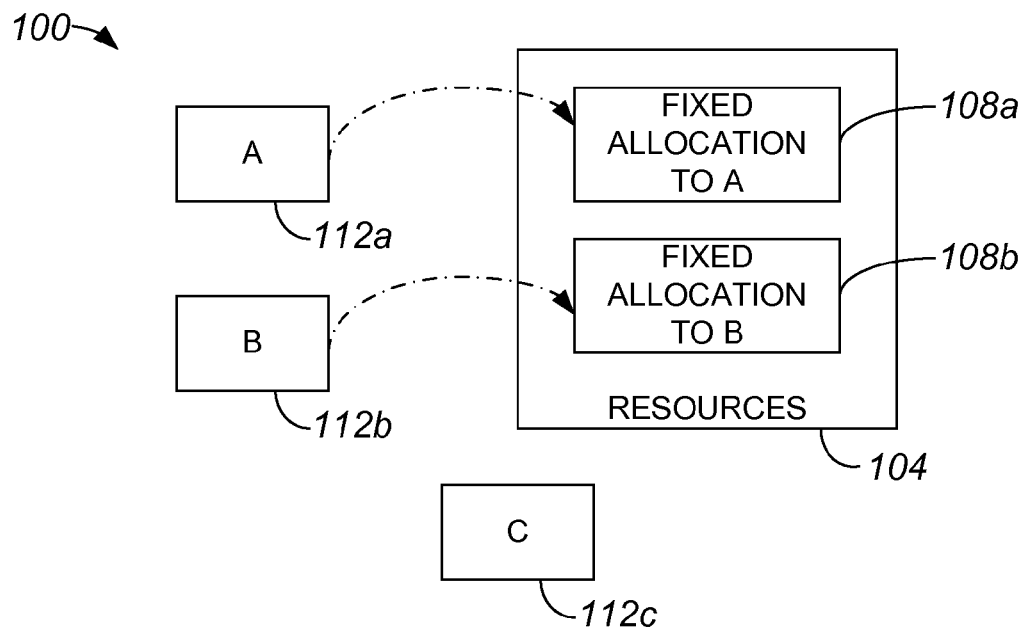
FIG. 1A is a block diagram representation of a system in which elements each have access to an associated fixed allocation of resources in accordance with an embodiment of the present invention.

In one embodiment, a method includes receiving a request to provision a first customer interface to a service instance, and identifying a resource capacity for a resource associated with a service controller of a system. A determination is made as to whether a sum of resource requirements for a first set of customer interfaces that does not include the first customer interface exceeds the resource capacity. The method further includes provisioning the first customer interface to the service instance if it is determined that the sum of the customer instance resource requirements does not exceed the resource capacity.

Description

In order to increase the likelihood that assured service levels may be achieved by a service provider, the allocation and reservation of resources may be performed when service provisioning is performed. That is, admission control and resource reservation may be performed when service provisioning occurs, as for example using router which support value-added services. Service provisioning generally includes the preparation of resources to perform a specific service, and the allocation of such resources amongst various users or customers. By performing a check of available resources and determining an allocation of such resources of a system at the time service provisioning occurs, it may effectively be ensured that resource limits at runtime may be maintained and that the resource capacity of a service controller of the system is not exceeded.

Performing resource reservation when service provisioning occurs allows virtualization to occur efficiently, and allows admission control to be based on resources. Virtualization generally involves the abstraction of resources, e.g., computing resources. A single resource may effectively be used as more than one logical resource as a result of virtualization. Hence, performing resource reservation when service provisioning occurs may prevent one user or customer from overusing the resources, as each user has at least a minimum amount of allocated resources.

In general, the resources of a system which may be reserved when service provisioning occurs may vary widely. Resources may include, but are not limited to, router services, bandwidth associated with a system, a central processing unit (CPU), a filter, and a memory. A system may include a router or a switch. A system may also include a network card. If a system includes a network card, resources associated with the network card may include, but are not limited to, CPU speed, memory, bandwidth, control filters, and memory filters.

A system that allows a resource to be reserved when service provisioning occurs may reserve a fixed amount of the resource to each customer or user of the resource such that the customer or user may access up to, but not more than, the fixed amount of the resource. Alternatively, a system that allows a resource to be reserved when service provisioning occurs may reserve a fixed, effectively minimum, amount of the resource to each customer, and also allow each customer access to a shared pool of the resource.

With reference to FIG. 1A, a system in which substantially only a fixed amount of resources are reserved for each anticipated user at service provisioning time will be described in accordance with an embodiment of the present invention. Within a system 100, users 112a-c may attempt to access resources 104. Resources 104 may be associated with a router arrangement such as a router or a switch in one embodiment. Resources 104 are arranged such that a fixed allocation 108a of resources 104 is reserved for user 112a, and a fixed allocation 108b of resources 104 is reserved for user 112b. As shown, there is no allocation of resources 104 to user 112c. As such, user 112c may not utilize resources 104.

When user 112a requests a service instance associated with resources 104, user 112a may access any amount of resources 104 that does not exceed the amount associated with fixed allocation 108a. In one embodiment, user 112a may access up to a substantially maximum amount of resources to which user 112a is predetermined to be entitled to. Such a substantially maximum amount may be an amount associated with fixed allocation 108a. Similarly, when user 112b has a requirement for resources 104, user 112b may use up to an amount associated with fixed allocation 108b. In general, the resources associated with fixed allocation 108a may substantially only be used by user 112a, and the resources associated with fixed allocation 108b may substantially only be used by user 112b.

Figure 1B:
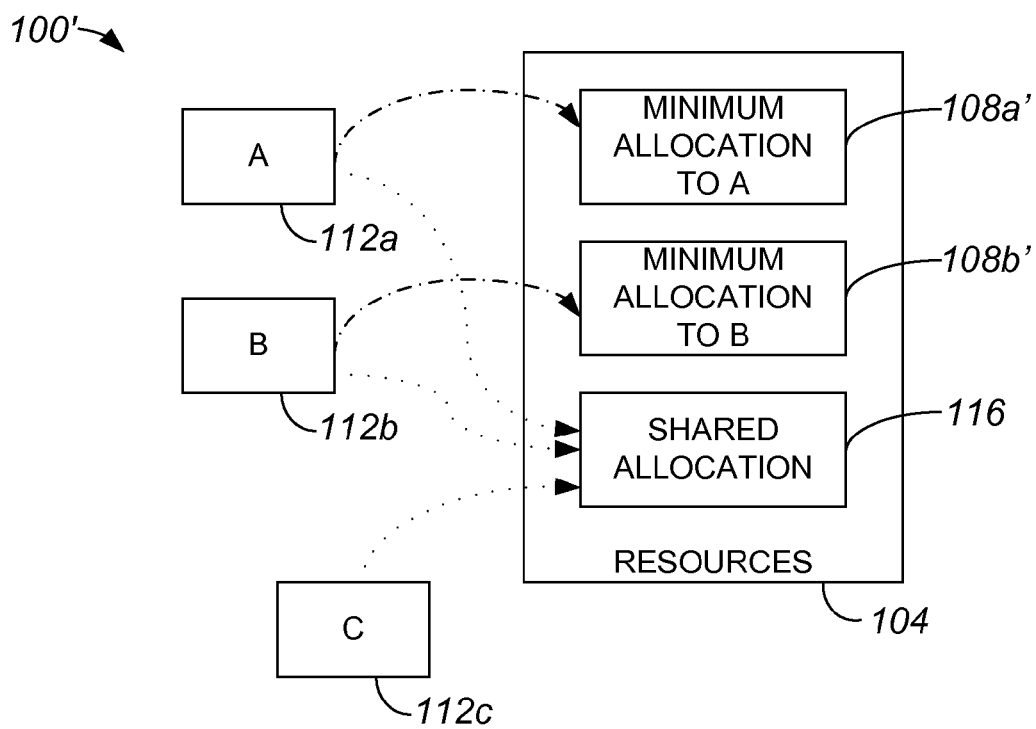
FIG. 1B is a block diagram representation of a system in which elements have each have access to an associated minimum allocation of resources and access to a shared allocation of resources in accordance with an embodiment of the present invention.

As previously mentioned, resources of a system may include a shared pool that may be utilized by substantially any suitable user within the system. FIG. 1B is a block diagram representation of a system in which a substantially minimum fixed amount of resources is reserved for each anticipated user, but users have access to a shared pool of the resources, in accordance with an embodiment of the present invention. Resources 104 within a system 100a' are arranged to be allocated such that a particular amount 108a' of resources 104 is reserved for user 112a at service provisioning time, and a particular amount 108b' of resources 104 is reserved for user 112b at service provisioning time. Particular amounts 108a', 108b' may effectively be minimum amount of resources 104 that users 112a, 112b, respectively, are entitled to.

In the event that users 112a, 112b have resource requirements that exceed particular amounts 108a', 108b', respectively, users 112a, 112b may access a shared pool 116 of resources 104. User 112c, which does not have an associated amount of reserved resources, may also access shared pool 116. The methods used to allocate shared resources 116 may vary widely. For example, shared resources 116 may be arranged to be allocated on a first-come-first-served basis, or may be allocated on a priority basis associated with the importance of user 112a-c. Shared resources 116 may also be arranged to be allocated such that each user 112a-c may access a predetermined maximum amount or percentage of shared pool 116.

Figure 2:
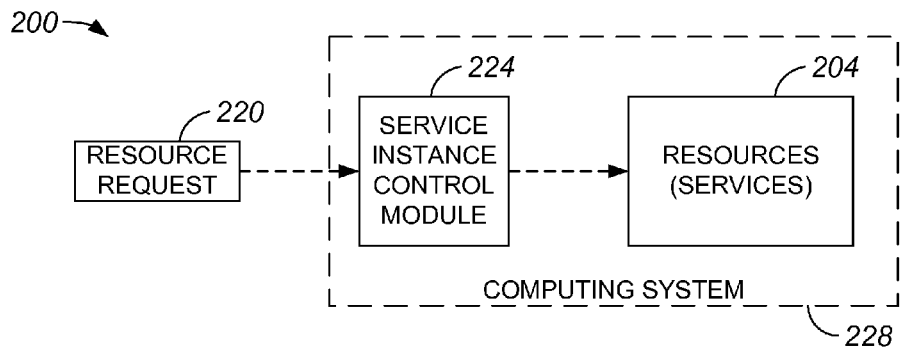
FIG. 2 is a block diagram representation of a system that checks resources at provisioning time in accordance with an embodiment of the present invention.

Resources are reserved, in one embodiment, for a customer or a plurality of customers by a computing system during service provisioning in response to a resource request. FIG. 2 is a block diagram representation of a system that checks resource capacity at provisioning time in accordance with an embodiment of the present invention. An overall system 200, which may be a part of a network includes a computing system 228. It should be appreciated that the network of which overall system 200 is a part may generally be any suitable network, as for example an asynchronous transfer mode (ATM) network or an internet protocol (IP) network. Computing system 228 may be associated with a router, and includes resources 204, e.g., virtualized services, and a service instance control module 224. Service instance control module 224 includes logic that controls service instances associated with each customer of resources 204, and logic that effectively ensures that ensuring only a predetermined number of customer interfaces are attached to a service instance (not shown). Such logic may generally be embodied as software and/or hardware devices on a tangible media.

When a request 220 for resources 204 is received by computing system 228, e.g., from a customer via a receiving interface (not shown), service instance control module ascertains whether there is a sufficient amount of resources 204 to accommodate request 220. In other words, service instance control module 224 also includes logic that checks customer instance resource requirements and ensures that the resource capacity of computing system 228 is not exceeded if request 220 is accommodated. Generally, service instance control module 224 validates request 220 against available capacity associated with resources 204 at provisioning time.

By way of example, if computing system 229 includes a router and resources 204 are distributed denial of service (DDoS) detection services, service instance control module 224 may determine that resource requirements for an associated provisioned service instance are a given bandwidth. As customer traffic to be monitored by system 228 may be configured over multiple customer instances, provisioning may include service instance control module 224 ensuring that the bandwidths of the multiple customer instances do not sum to higher than the given bandwidth.

Figure 3:
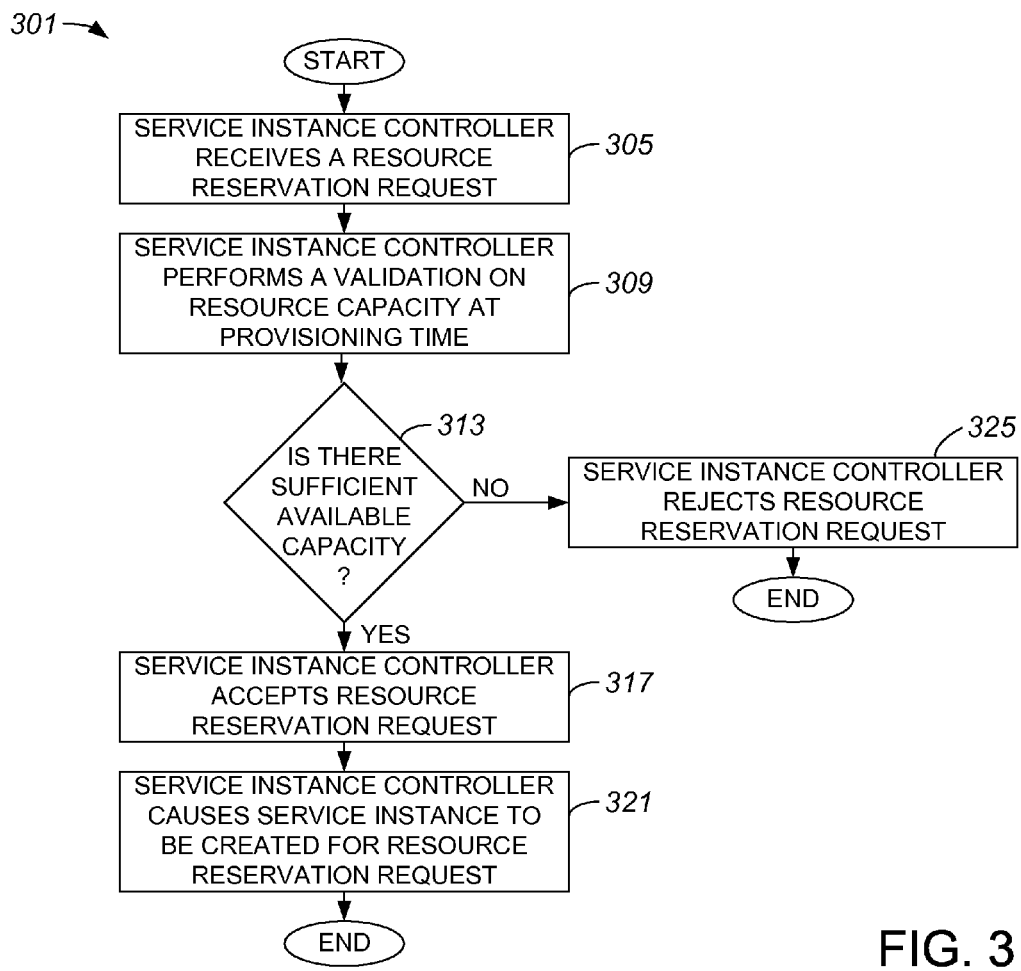
FIG. 3 is a process flow diagram which illustrates one method of supporting resource reservations at a customer level in accordance with an embodiment of the present invention.

Referring next to FIG. 3, one method of supporting resource reservations at a user or customer level will be described in accordance with an embodiment of the present invention. A process 301 of supporting resource reservations begins at step 305 in which a service instance controller, e.g., a service instance controller associated with a router or a switch, receives a resource reservation request from a user or a customer. Once the service instance controller receives a resource reservation request, the service instance controller performs a validation on the resource capacity in step 309. A validation of resource capacity occurs at the time of service provisioning. It is then determined in step 313 whether there is sufficient available resource capacity to support the resource reservation request. In other words, the service instance controller determines if there are sufficient resources that may be reserved for the user.

If the determination in step 313 is that there is insufficient available resource capacity to support the resource reservation request, the service instance controller rejects the resource reservation request in step 325, and the process of supporting resource reservations is completed. Alternatively, if it is determined in step 313 that there is available resource capacity to support the resource reservation request, the service instance controller accepts the resource reservation request in step 317. From step 317, process flow moves to step 321 in which the service instance controller causes a service instance to be created for the resource reservation request. The service instance may be created in cooperation with a provisioning mechanism that allows a user to configure resource parameters, e.g., when the resource reservation request is made, that are to be used with a service instance. In general, however, resource requirements associated with a service instance may be either implied or explicit. After the service instance is created, the process of supporting resource reservations is completed.

Resource reservations are typically made to enable users or customers to have access to the resources when access is needed. The ability to reserve resources at a customer level enables customers to effectively ensure that the resources are available when needed. As such, admission control is effectively provided such that customers which have not reserved resources do not use resources that are reserved by other customers, and such that customers who have reserved an amount of resource are generally not allowed to use more resources than they may be entitled to. In one embodiment, the enforcement of resource limits at runtime may be managed by a runtime resource control mechanism that is part of an overall system which allows admission control for virtualized services in routers or switches.

Figure 4A:
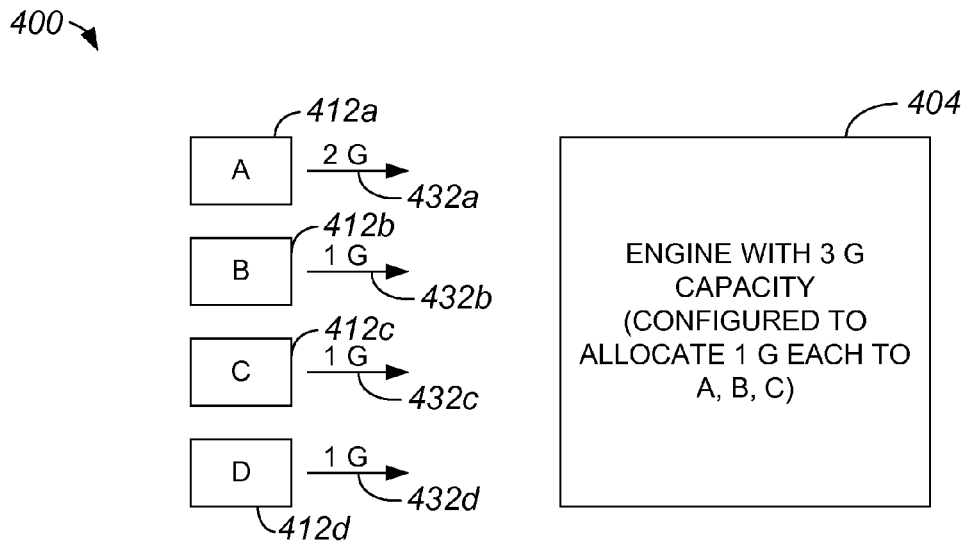
FIG. 4A is a block diagram representation of an engine that receives more resource reservation requests than the engine may support in accordance with an embodiment of the present invention.

FIG. 4A is a block diagram representation of an engine that performs admission control when the engine receives more resource reservation requests than may be supported in accordance with an embodiment of the present invention. An engine 404, which may be associated with a router or a switch, may have a fixed capacity in terms of the number of gigabits (G) that engine 404 may process at any given time. In the described embodiment, engine 404 may have three G of resources, although it should be appreciated that engine 404 may have any amount of resources and that the resources may not necessarily be measured in gigabits. The allocation of the capacity of engine 404 may be such that engine 404 is configured to allocated approximately one G to each of customers 412a-c, and no G to customer 412d. As such, admission control allows customers 412a-c to each utilize no more than one G of the total capacity of engine 404, while preventing customer 412d from utilizing any of the capacity of engine 404.

Figure 4B:
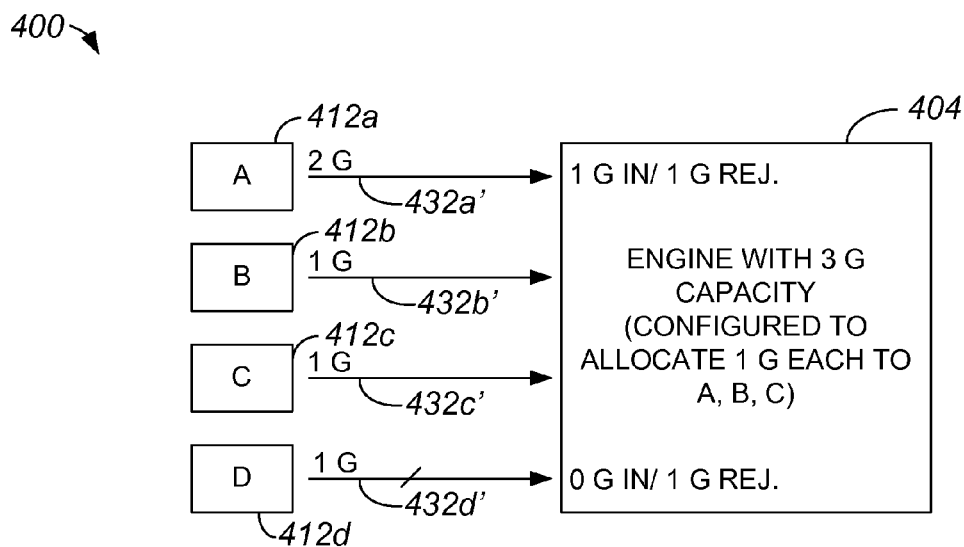
FIG. 4B is a block diagram representation of an engine, e.g., engine 404 of FIG. 4A, that intelligently allocates assigned resources in accordance with an embodiment of the present invention.

As shown, customer 412a may output a signal 432a that attempts to access two G of the capacity of engine 404, while customers 412b-d each output signals 432b-d, respectively, that attempt to access one G of the capacity of engine 404. As engine 404 does not include a shared pool of resources from which customers 412a-d may obtain additional resources if needed, admission control associated with engine 404 will effectively intelligently allocate resources. Referring next to FIG. 4B, admission control associated with engine 404 is such that each customer 412a-d is entitled to utilize up to, but not over, the amount of resources each customer 412a-d reserved at service provisioning time. Hence, as customers 412b, 412c have each reserved one G of resources and are attempting to utilize one G of resources, customers 412b, 412c are each allowed to provide one G signals 432b', 432c', respectively, to engine 404.

As customer 412a has reserved one G of resources and is attempting to utilize two G of resources, engine will process one G of a two G signal 432a' obtained from customer 412a, and will effectively discard one G of two G signal 432a'. As there are no resources allocated to customer 412d', a one G signal 432d' from customer 412d' may not utilize any resources associated with engine 404.

Figure 5A:
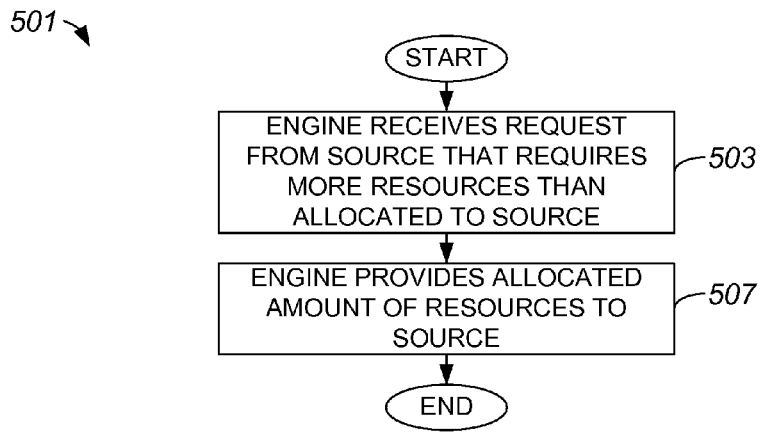
FIG. 5A is a process flow diagram which illustrates one method of allocating resources when a resource request exceeds an allocation in a system with no shared pool of resources in accordance with an embodiment of the present invention.

With reference to FIG. 5A, the runtime processing of a request from a customer for resources in an amount that exceeds the allocation to the customer will be described in the context of a system that does not include a shared pool of resources in accordance with an embodiment of the present invention. A process 501 begins at step 503 in which an engine, i.e., an engine that is part of a system such as a router or a network card, receives a request for a resource from a source such as a customer. The request, in the described embodiment, is a request for a higher allocation of the resource than the customer has been allocated. The source may generally be a computing system that is in communication with the engine.

Upon receiving the request, the engine provides the allocated amount of the resource to the source in step 507. Typically, such an allocated amount is a fixed allocated amount. By providing substantially only the amount of the resource to which the source in entitled, the engine is effectively restricting the source to utilizing the maximum amount of resource which the source is allowed to use or to access, regardless of how much of the resource the source requested. Once the engine provides the allocated amount of the resource to the source, the runtime processing of a request for the resource is completed.

Figure 5B:
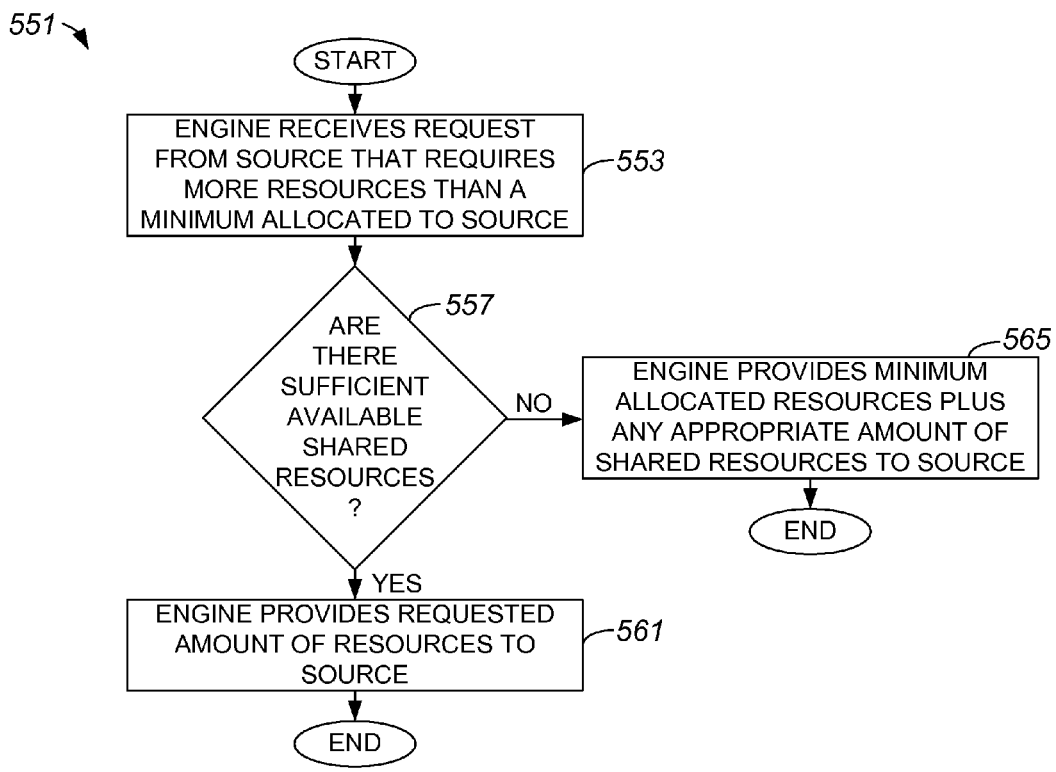
FIG. 5B is a process flow diagram which illustrates one method of allocating resources when a resource request exceeds an allocation in a system with a shared pool of resources in accordance with an embodiment of the present invention.

A system may be such that a user is allocated a minimum allocation of resources, and the system may include a pool of resources that may be shared amongst a plurality of users, as for example on a first-come-first-served basis. In such a system, a user request for more resources than the minimum allocated to the user may result in the user being granted access to a portion of the pool of resources. FIG. 5B is a process flow diagram which illustrates a method of allocating resources in response to a request for more than a minimum allocation of resources in a system with a shared pool of resources in accordance with an embodiment of the present invention. A process 551 of allocating resources begins at step 553 in which an engine receives a request from a source or a customer for more resources than a minimum allocated to the source. A determination is made by the engine in step 557 regarding whether there are sufficient available shared resources to effectively make up the difference between the minimum allocation of resources to the source and the requested amount. Such a determination may include a determination of whether there is any amount of shared resources that is available, e.g., whether substantially all of the shared pool of resources is already in use, and/or a determination of whether there is a sufficient amount left in the shared pool of resources to substantially fully accommodate the request.

If it is determined in step 557 that sufficient available shared resources are not available, the indication may be that either all of the shared resources are in use or that the amount of available shared resources is not sufficient to make up the difference between the minimum allocation of resources to the source and the requested amount. Alternatively, the indication may be that a maximum amount of the shared resources which is predetermined to be allocable to the source is not sufficient to meet the request. Accordingly, process flow moves from step 557 to step 565 in which the engine provides the source with the minimum amount of resources allocated to the source, and also provides any appropriate amount of shared resources to the source. The appropriate amount may be, for example, a maximum amount of the shared resources to which the source is determined to be entitled. Once the engine provides the source with resources, the process of allocating resources is completed.

Returning to step 557, if it is determined that there are sufficient available shared resources, the implication is that the request for more resources than the minimum allocated to the source may be fulfilled. As such, in step 561, the engine provides the requested amount of resources to the source, and the process of allocating resource is completed.

Although only a few embodiments of the present invention have been described, it should be understood that the present invention may be embodied in many other specific forms without departing from the spirit or the scope of the present invention. By way of example, although the support of resource reservations at a customer level has been described as being associated with a router or a switch, resource reservations which occur at a customer level during the time of service provisioning are not limited to being associated with a router or a switch. Substantially any computing system or element which supports or otherwise provides virtualized services may be arranged to support resource reservations at a customer level.

Priorities may generally be assigned to customers, e.g., applications, which attempt to access a resource. For instance, for an embodiment in which a resource is memory, and there are multiple thresholds applied to the memory, if multiple applications each have an amount of resources reserved and the highest memory threshold is reached by active applications, the application with the lowest priority for the memory may be denied access to the memory.

In lieu of priorities, access to reserved resources may be based upon the amount of total resources associated with active customers. For example, in some systems, resources may be assigned such that each customer may utilize a particular percentage of the resource. If there are four customers who are attempting to receive service admission to the resources, but a combination of the first three customers who are attempting to receive service admissions would result in more than one hundred percent of the resources being used, the combination of the first three customers requesting access may not be admitted access to the resource. Instead, the customer, who is typically the last of the first three customers, that would cause the percentage of resources being used to exceed one hundred percent may be denied access to the resource while the first two customers are allowed access. If, however, a combination of the first, second, and fourth customers requesting access brings the total resource usage to a percentage that is less than approximately one hundred percent, then the first, second, and fourth customers may be granted access in accordance with an embodiment of the present invention. It should be appreciated that if there is no fourth customer, then the first and second customers may be granted access while the third customer is denied access, and the percentage of the resources being used may be less than one hundred percent.

Resources which may be checked at service provisioning time may vary widely. Resources may include application data such as filters, CPU, memory, and bandwidth, as described above. In general, resources may include substantially any services which may be virtualized, and for which admission control may be based on the resources.

Services on a router may be bundled together on a service blade. When a customer attempts to divert traffic onto service blades, admission control may be used to determine what traffic may be diverted onto a given service blade. Such an admission control may be performed based upon a set of resources that may likely be exhausted first. Providing such admission control at a customer level, e.g., a switch or router level, after allowing resources to be reserved at the customer level, enables admission control to be accurately and efficiently performed.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
   receiving a request to provision a first customer interface to a service instance associated with a router arrangement, the request being received from a first customer;
   identifying a resource capacity for a resource associated with a service controller associated with the router arrangement, the resource capacity being associated with a first amount of the resource available to be reserved, wherein the resource includes a shared amount of the resource which is not reserved but is available for access by the first customer;
   determining if a sum of customer instance resource requirements for a first set of customer interfaces exceeds the resource capacity, wherein the first customer interface is not included in the first set of customer interfaces; and
   provisioning the first customer interface to the service instance if it is determined that the sum of the customer instance resource requirements does not exceed the resource capacity, wherein provisioning the first customer interface to the service instance includes reserving at least a portion of the first amount of the resource capacity, the portion being reserved for the first customer.

2. The method of claim 1 further including:
   rejecting the first customer interface to the service instance if it is determined that the sum of the customer instance resource requirements exceeds the resource capacity, wherein rejecting the first customer interface to the service instance includes allocating no amount of the resource capacity to the first customer interface.

3. The method of claim 1 wherein reserving at least the portion of the first amount of the resource capacity includes allocating a fixed amount of the resource capacity to only the first customer interface, the method further including:
   creating the service instance.

4. The method of claim 3 further including:
   granting the first customer interface access to the shared amount of the resource capacity, wherein the first customer interface is arranged to access the shared amount if the first customer interface utilizes more than the fixed amount of the resource capacity.

5. The method of claim 3 wherein the first customer interface requires a first amount of the resource capacity, and wherein if the first amount of the resource capacity exceeds the fixed amount of the resource capacity, the first customer interface is allowed to utilize the fixed amount of the resource capacity and to access at least a part of the second amount, the second amount being arranged to be shared by a plurality of customer interfaces including the first customer interface.

6. The method of claim 3 wherein the first customer interface requires a first amount of the resource capacity, and wherein if the first amount of the resource capacity exceeds the fixed amount of the resource capacity, provisioning the first customer interface to the service instance further includes allowing the first customer interface to utilize the fixed amount of the resource capacity and to access a part of the shared amount, the shared amount being arranged to be shared by a plurality of customer interfaces including the first customer interface, the part being a maximum amount of the shared amount that the first customer interface is entitled to access.

7. The method of claim 6 wherein a sum of the fixed amount and the part is less than the first amount.

8. The method of claim 1 wherein the resource is one selected from the group including a central processing unit (CPU), a filter, and a memory.

9. A non-transitory tangible media including logic encoded thereon for execution, wherein the logic when executed is operable to:
   receive a request to provision a first customer interface to a service instance associated with a router arrangement, the request being received from a first customer;
   identify a resource capacity for a resource associated with a service controller associated with the router arrangement, the resource capacity being associated with a first amount of the resource available to be reserved, wherein the resource includes a shared amount of the resource which is not reserved but is available for access by the first customer;
   determine if a sum of customer instance resource requirements for a first set of customer interfaces exceeds the resource capacity, wherein the first customer interface is not included in the first set of customer interfaces; and
   provision the first customer interface to the service instance if it is determined that the sum of the customer instance resource requirements does not exceed the resource capacity, wherein the logic operable to provision the first customer interface to the service instance is operable to reserve at least a portion of the first amount of the resource capacity, the portion being reserved for the first customer.

10. The non-transitory tangible media of claim 9 wherein the logic is further operable to:
reject the first customer interface to the service instance if it is determined that the sum of the customer instance resource requirements exceeds the resource capacity, wherein the logic operable to reject the first customer interface to the service instance is further operable to allocate no amount of the resource capacity to the first customer interface.

11. The non-transitory tangible media of claim 9 wherein the logic operable to reserve at least the first portion of the first amount of the resource capacity is further operable to allocate a fixed amount of the resource capacity to the first customer interface, and to create the service instance.

12. The non-transitory tangible media of claim 11 wherein the logic is further operable to:
grant the first customer interface access to a shared amount of the resource capacity, wherein the first customer interface is arranged to access the shared amount if the first customer interface utilizes more than the fixed amount of the resource capacity.

13. The non-transitory tangible media of claim 11 wherein the first customer interface requires a first amount of the resource capacity, and wherein if the first amount of the resource capacity exceeds the fixed amount of the resource capacity, the first customer interface is allowed to utilize only the fixed amount of the resource capacity.

14. The non-transitory tangible media of claim 9 wherein the resource is one selected from the group including a router service, bandwidth associated with the system, a central processing unit (CPU), a filter, and a memory.

15. The non-transitory tangible media of claim 9 wherein the logic is further operable to:
provide admission control to the resource.

16. An apparatus comprising:
a resource;
a first interface, the first interface being arranged to obtain a resource reservation request at a service provisioning time, the resource reservation request being arranged to request a provisioning of a customer interface to a service instance, the resource reservation request to being received from a first customer; and
a service instance controller, the service instance controller being arranged to determine a capacity associated with the resource, the service instance controller further being arranged to determine if fulfilling the resource reservation request would exceed the capacity, wherein the service instance controller is still further arranged to provision the customer interface to the service instance if it is determined that fulfilling the resource reservation request would not exceed the capacity, wherein the service instance controller is arranged to provision the customer interface to the service instance by allocating at least a first amount of the resource to the first customer, the first amount of the resource being associated with a reservable portion of the resource, the resource further including a shareable portion that is arranged to be accessed by the first customer but is not reserved by the first customer.

17. The apparatus of claim 16 wherein the resource is associated with a virtualized service.

18. The apparatus of claim 16 wherein the apparatus is a router arrangement, and the resource is a router resource.

19. The apparatus of claim 16 wherein the resource is one selected from the group including a router service, bandwidth associated with the system, a central processing unit (CPU), a filter, and a memory.

20. The apparatus of claim 16 wherein the service instance controller is arranged to allocate a fixed amount of the capacity to the customer interface.

21. The apparatus of claim 16 wherein the resource includes a first portion, a second portion, and a shared portion, and wherein the first portion is reserved for a first customer associated with the resource reservation request.

22. The apparatus of claim 21 wherein the second portion is reserved for a second customer, and the shared portion is not reserved for either the first customer or the second customer.

23. A method comprising:
receiving a resource reservation request, the resource reservation request including a request to provision a first customer interface to a service instance associated with a router arrangement;
identifying an amount of a resource that is available to be reserved, wherein the resource includes at least the amount of the resource that is available to be reserved and a portion of the resource that is available to be shared;
determining if the amount of the resource that is available to be reserved is sufficient to accommodate the resource reservation request;
provisioning the first customer interface to the service instance if it is determined that the amount of the resource that is available to be reserved is sufficient to accommodate the resource reservation request, wherein provisioning the first customer interface to the service instance includes allocating a predetermined amount of the resource to the first customer interface; and
rejecting the resource reservation request if it is determined that the amount of the resource that is available to be reserved is not sufficient to accommodate the resource reservation request, wherein rejecting the resource reservation request includes allowing the first customer interface to access the portion of the resource that is available to be shared.

* * * * *